(12) United States Patent
Ziv et al.

(10) Patent No.: US 9,401,145 B1
(45) Date of Patent: *Jul. 26, 2016

(54) SPEECH ANALYTICS SYSTEM AND SYSTEM AND METHOD FOR DETERMINING STRUCTURED SPEECH

(71) Applicant: Verint Systems, Ltd., Herzliya Pituach (IL)

(72) Inventors: Omer Ziv, Rehovot (IL); Ran Achituv, Hod Hasharon (IL); Ido Shapira, Tel Aviv (IL)

(73) Assignee: VERINT SYSTEMS LTD., Herzilya Pituach (IL)

(*) Notice: Subject to any disclaimer, the term of this patent is extended or adjusted under 35 U.S.C. 154(b) by 0 days.

This patent is subject to a terminal disclaimer.

(21) Appl. No.: 14/270,280

(22) Filed: May 5, 2014

Related U.S. Application Data

(62) Division of application No. 12/755,549, filed on Apr. 7, 2010, now Pat. No. 8,719,016.

(60) Provisional application No. 61/178,795, filed on May 15, 2009, provisional application No. 61/167,495, filed on Apr. 7, 2009.

(51) Int. Cl.
*G10L 15/00* (2013.01)
*G10L 15/20* (2006.01)
*G10L 15/19* (2013.01)
*G10L 15/26* (2006.01)

(52) U.S. Cl.
CPC ............ *G10L 15/20* (2013.01); *G10L 15/19* (2013.01); *G10L 15/26* (2013.01)

(58) Field of Classification Search
USPC .............. 704/9, 235, 246, 247, 251, 252, 260
See application file for complete search history.

(56) References Cited

U.S. PATENT DOCUMENTS

| 3,594,919 A | 7/1971 | De Bell et al. |
| 3,705,271 A | 12/1972 | De Bell et al. |
| 4,510,351 A | 4/1985 | Costello et al. |

(Continued)

FOREIGN PATENT DOCUMENTS

| EP | 0453128 | 10/1991 |
| EP | 0773687 | 5/1997 |

(Continued)

OTHER PUBLICATIONS

PCT International Search Report, International Application No. PCT/US03/02541, mailed May 12, 2003.

(Continued)

*Primary Examiner* — Loenard Saint Cyr
(74) *Attorney, Agent, or Firm* — Meunier Carlin & Curfman

(57) ABSTRACT

A method for converting speech to text in a speech analytics system is provided. The method includes receiving audio data containing speech made up of sounds from an audio source, processing the sounds with a phonetic module resulting in symbols corresponding to the sounds, and processing the symbols with a language module and occurrence table resulting in text. The method also includes determining a probability of correct translation for each word in the text, comparing the probability of correct translation for each word in the text to the occurrence table, and adjusting the occurrence table based on the probability of correct translation for each word in the text.

6 Claims, 6 Drawing Sheets

(56) References Cited

U.S. PATENT DOCUMENTS

| | | |
|---|---|---|
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,740,318 A * | 4/1998 | Naito et al. .................. 704/253 |
| 5,742,670 A | 4/1998 | Bennett |
| 5,748,499 A | 5/1998 | Trueblood |
| 5,757,644 A | 5/1998 | Jorgensen et al. |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,918,222 A | 6/1999 | Fukui et al. |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,100,891 A | 8/2000 | Thorne |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,173,437 B1 | 1/2001 | Polcyn |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,721,734 B1 | 4/2004 | Subasic et al. |
| 6,724,887 B1 | 4/2004 | Eilbacher et al. |
| 6,738,456 B2 | 5/2004 | Wrona et al. |
| 6,751,614 B1 | 6/2004 | Rao |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,054 B1 | 11/2004 | Suhm et al. |
| 6,823,384 B1 | 11/2004 | Wilson et al. |
| 6,870,916 B2 | 3/2005 | Henrikson et al. |
| 6,871,229 B2 | 3/2005 | Nisani et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 7,039,166 B1 | 5/2006 | Peterson et al. |
| 7,170,979 B1 | 1/2007 | Byrne et al. |
| 7,295,980 B2 | 11/2007 | Garner et al. |
| 7,310,600 B1 | 12/2007 | Garner et al. |
| 7,346,509 B2 | 3/2008 | Gallino |

(56) References Cited

U.S. PATENT DOCUMENTS

| | | |
|---|---|---|
| 7,577,246 B2 | 8/2009 | Idan et al. |
| 7,590,542 B2 | 9/2009 | Williams et al. |
| 7,613,717 B1 | 11/2009 | Reed et al. |
| 7,664,747 B2 | 2/2010 | Petras et al. |
| 7,706,520 B1 | 4/2010 | Waterson et al. |
| 7,720,214 B2 | 5/2010 | Ricketts |
| 7,865,510 B2 | 1/2011 | Hillary et al. |
| 7,913,063 B1 | 3/2011 | Lyerly |
| 7,953,219 B2 | 5/2011 | Freedman et al. |
| 7,991,613 B2 | 8/2011 | Blair |
| 7,996,210 B2 | 8/2011 | Godbole et al. |
| 8,023,636 B2 | 9/2011 | Koehler et al. |
| 8,054,964 B2 | 11/2011 | Flockhart et al. |
| 8,055,503 B2 | 11/2011 | Scarano et al. |
| 8,060,364 B2 | 11/2011 | Bachar et al. |
| 8,108,237 B2 | 1/2012 | Bourne et al. |
| 8,112,306 B2 | 2/2012 | Lyerly et al. |
| 8,200,527 B1 | 6/2012 | Thompson et al. |
| 8,219,555 B1 | 7/2012 | Mianji |
| 8,396,741 B2 | 3/2013 | Kannan et al. |
| 8,417,713 B1 | 4/2013 | Blair-Goldensohn et al. |
| 8,463,595 B1 | 6/2013 | Rehling et al. |
| 8,463,606 B2 | 6/2013 | Scott et al. |
| 8,504,371 B1 | 8/2013 | Vacek et al. |
| 8,531,501 B2 | 9/2013 | Portman et al. |
| 8,583,434 B2 | 11/2013 | Gallino |
| 8,626,753 B1 | 1/2014 | Aggarwal et al. |
| 8,805,717 B2 | 8/2014 | Fleming et al. |
| 8,965,765 B2* | 2/2015 | Zweig et al. ............ 704/251 |
| 2001/0000962 A1 | 5/2001 | Rajan |
| 2001/0032335 A1 | 10/2001 | Jones |
| 2001/0043697 A1 | 11/2001 | Cox et al. |
| 2002/0002460 A1 | 1/2002 | Pertrushin |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128821 A1 | 9/2002 | Ehsani et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2002/0188507 A1 | 12/2002 | Busche |
| 2003/0040909 A1 | 2/2003 | Ghali |
| 2003/0055654 A1 | 3/2003 | Oudeyer |
| 2003/0055883 A1 | 3/2003 | Wiles et al. |
| 2003/0079020 A1 | 4/2003 | Gourraud et al. |
| 2003/0099335 A1 | 5/2003 | Tanaka et al. |
| 2003/0144900 A1 | 7/2003 | Whitmer |
| 2003/0154240 A1 | 8/2003 | Nygren et al. |
| 2003/0204404 A1 | 10/2003 | Weldon et al. |
| 2004/0062364 A1 | 4/2004 | Dezonno et al. |
| 2004/0068406 A1* | 4/2004 | Maekawa et al. ............ 704/235 |
| 2004/0098265 A1 | 5/2004 | Kelly et al. |
| 2004/0100507 A1 | 5/2004 | Hayner et al. |
| 2004/0165717 A1 | 8/2004 | McIlwaine et al. |
| 2005/0022106 A1 | 1/2005 | Kawai et al. |
| 2005/0108518 A1 | 5/2005 | Pandaya et al. |
| 2005/0133565 A1 | 6/2005 | Lee et al. |
| 2005/0165819 A1 | 7/2005 | Kudoh et al. |
| 2005/0170326 A1 | 8/2005 | Koehler et al. |
| 2005/0216269 A1 | 9/2005 | Scahill et al. |
| 2005/0221268 A1 | 10/2005 | Chaar et al. |
| 2006/0074689 A1 | 4/2006 | Cosatto et al. |
| 2006/0080107 A1 | 4/2006 | Hill et al. |
| 2006/0085186 A1 | 4/2006 | Ma et al. |
| 2006/0179064 A1 | 8/2006 | Paz et al. |
| 2006/0188075 A1 | 8/2006 | Peterson |
| 2006/0235690 A1 | 10/2006 | Tomasic et al. |
| 2007/0011005 A1 | 1/2007 | Morrison et al. |
| 2007/0016580 A1 | 1/2007 | Mann et al. |
| 2007/0043608 A1 | 2/2007 | May et al. |
| 2007/0071206 A1 | 3/2007 | Gainsboro et al. |
| 2007/0150275 A1 | 6/2007 | Garner et al. |
| 2007/0198249 A1 | 8/2007 | Adachi et al. |
| 2007/0198329 A1 | 8/2007 | Lyerly et al. |
| 2007/0198330 A1 | 8/2007 | Korenblit et al. |
| 2007/0211881 A1 | 9/2007 | Parker-Stephen |
| 2008/0022211 A1 | 1/2008 | Jones et al. |
| 2008/0080698 A1 | 4/2008 | Williams et al. |
| 2008/0082329 A1 | 4/2008 | Watson |
| 2008/0082330 A1 | 4/2008 | Blair |
| 2008/0082341 A1 | 4/2008 | Blair |
| 2008/0097985 A1 | 4/2008 | Olstad et al. |
| 2008/0120253 A1 | 5/2008 | Abdulali |
| 2008/0177538 A1 | 7/2008 | Roy et al. |
| 2008/0195385 A1 | 8/2008 | Pereg et al. |
| 2008/0215543 A1 | 9/2008 | Huang et al. |
| 2008/0235018 A1 | 9/2008 | Eggen et al. |
| 2008/0249764 A1 | 10/2008 | Huang et al. |
| 2008/0281581 A1 | 11/2008 | Henshaw et al. |
| 2008/0300872 A1 | 12/2008 | Basu |
| 2009/0087822 A1 | 4/2009 | Stanton et al. |
| 2009/0092241 A1 | 4/2009 | Minert et al. |
| 2009/0119268 A1 | 5/2009 | Bandaru et al. |
| 2009/0138262 A1 | 5/2009 | Agarwal et al. |
| 2009/0222551 A1 | 9/2009 | Neely et al. |
| 2009/0228264 A1 | 9/2009 | Williams et al. |
| 2009/0228428 A1 | 9/2009 | Dan et al. |
| 2009/0248399 A1 | 10/2009 | Au |
| 2009/0258333 A1* | 10/2009 | Yu ............................ 434/157 |
| 2009/0265332 A1 | 10/2009 | Mushtaq et al. |
| 2009/0292538 A1 | 11/2009 | Barnish |
| 2009/0313016 A1* | 12/2009 | Cevik et al. ............ 704/241 |
| 2009/0327279 A1 | 12/2009 | Adachi et al. |
| 2010/0005081 A1 | 1/2010 | Bennett |
| 2010/0076765 A1* | 3/2010 | Zweig et al. ............ 704/255 |
| 2010/0091954 A1 | 4/2010 | Dayanidhi et al. |
| 2010/0098225 A1 | 4/2010 | Ashton et al. |
| 2010/0104086 A1 | 4/2010 | Park |
| 2010/0104087 A1 | 4/2010 | Byrd et al. |
| 2010/0119053 A1 | 5/2010 | Goeldi |
| 2010/0121857 A1 | 5/2010 | Elmore et al. |
| 2010/0145940 A1 | 6/2010 | Chen et al. |
| 2010/0161315 A1 | 6/2010 | Melamed et al. |
| 2010/0198584 A1 | 8/2010 | Habu et al. |
| 2010/0246799 A1 | 9/2010 | Lubowich et al. |
| 2010/0253792 A1 | 10/2010 | Kawaguchi et al. |
| 2010/0262454 A1 | 10/2010 | Sommer et al. |
| 2010/0274618 A1 | 10/2010 | Byrd et al. |
| 2010/0329437 A1 | 12/2010 | Jeffs et al. |
| 2010/0332287 A1 | 12/2010 | Gates et al. |
| 2011/0010173 A1 | 1/2011 | Scott et al. |
| 2011/0055223 A1 | 3/2011 | Elmore et al. |
| 2011/0078167 A1 | 3/2011 | Sundaresan et al. |
| 2011/0082874 A1 | 4/2011 | Gainsboro et al. |
| 2011/0093479 A1 | 4/2011 | Fuchs |
| 2011/0178803 A1 | 7/2011 | Petrushin |
| 2011/0191106 A1 | 8/2011 | Khor et al. |
| 2011/0196677 A1 | 8/2011 | Deshmukh et al. |
| 2011/0208522 A1 | 8/2011 | Pereg et al. |
| 2011/0216905 A1 | 9/2011 | Gavalda et al. |
| 2011/0225115 A1 | 9/2011 | Moitra et al. |
| 2011/0238670 A1 | 9/2011 | Mercuri |
| 2011/0246442 A1 | 10/2011 | Bartell |
| 2011/0249811 A1 | 10/2011 | Conway et al. |
| 2011/0282661 A1 | 11/2011 | Dobry et al. |
| 2011/0307257 A1 | 12/2011 | Pereg et al. |
| 2012/0046938 A1 | 2/2012 | Godbole et al. |
| 2012/0130771 A1 | 5/2012 | Kannan et al. |
| 2012/0131021 A1 | 5/2012 | Blair-Goldensohn et al. |
| 2012/0143597 A1 | 6/2012 | Mushtaq et al. |
| 2012/0215535 A1 | 8/2012 | Wasserblat et al. |
| 2012/0245942 A1 | 9/2012 | Zechner et al. |
| 2012/0253792 A1 | 10/2012 | Bespalov et al. |
| 2013/0018875 A1 | 1/2013 | Qiao |
| 2013/0204613 A1 | 8/2013 | Godbole et al. |
| 2013/0297581 A1 | 11/2013 | Ghosh et al. |
| 2013/0297619 A1 | 11/2013 | Chandrasekaran et al. |
| 2013/0325660 A1 | 12/2013 | Callaway |
| 2014/0012863 A1 | 1/2014 | Sundaresan et al. |
| 2014/0067390 A1 | 3/2014 | Webb |

(56) References Cited

U.S. PATENT DOCUMENTS

FOREIGN PATENT DOCUMENTS

| EP | 0989720 | 3/2000 |
|---|---|---|
| GB | 2369263 | 5/2002 |
| WO | 98/43380 | 11/1998 |
| WO | 00/16207 | 3/2000 |

OTHER PUBLICATIONS

Phaup, "New Software Puts Computerized Tests on the Internet: Presence Corporation announces breakthrough Question Mark Web product," Web page, unverified print date of Apr. 1, 2002.
Phaup, "QM Perception Links with Integrity Training's WBT Manager to Provide Enhanced Assessments for Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available to high-volume users," Web page, unverified print date of Apr. 1, 2002, unverified cover date of May 6, 1996.
Piskurich, "Now-You-See-'Em, Now-You-Don't Learning Centers," Technical Training pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," Technical Skills and Training pp. 6-8 (May/Jun. 1995).
Rohde, "Gates Touts Interactive TV", InfoWorld, Oct. 14, 1999.
Ross, "Broadcasters Use TV Signals to Send Data", PC World, Oct. 1996
"Setting up switched port analyzer for monitoring and recording IP-ICD agents on the Cisco ICS 7750", Cisco Systems, Nov. 22, 2002. http://www.cisco.com/en/US/docs/routers/access/ics7750/software/notes/icsspan.html.
Stewart, "Interactive Television at Home: Television Meets the Internet", Aug. 1998.
Stormes, "Case Study: Restructuring Technical Training Using ISD," Technical Skills and Training pp. 23-26 (Feb./Mar. 1997).
Tennyson, "Artificial Intelligence Methods in Computer-Based Instructional Design," Journal of Instruction Development 7(3):17-22 (1984).
The Editors, Call Center, The Most Innovative Call.
Tinoco et al., "Online Evaluation in WWW-based Courseware," ACM pp. 194-198 (1997).
Uiterwijk et al., "The virtual classroom," InfoWorld 20(47):6467 (Nov. 23, 1998).
Unknown Author, "Long-distance learning," InfoWorld 20(36):7276 (1998).
Aspect Call Center Product Specification, "Release 2.0", Aspect Telecommunications Corporation, May 23, 1998, p. 798.
"Customer Spotlight: Navistar International," Web page, unverified print date of Apr. 1, 2002.
DKSystems Integrates QM Perception with OnTrack for Training, Web page, unverified print date of Apr. 1, 2002, unverified cover date of Jun. 15, 1999.
"OnTrack Online" Delivers New Web Functionality, Web page, unverified print date of Apr. 2, 2002, unverified cover date of Oct. 5, 1999.
"Price Waterhouse Coopers Case Study: The Business Challenge," Web page, unverified cover date of 2000.
Abstract, net.working: "An Online Webliography," Technical Training pp. 4-5 (Nov./Dec. 1998).
Adams et al., "Our Turn-of-the-Century Trend Watch" Technical Training, pp. 46-47, (Nov./Dec. 1998).
Anderson: Interactive TVs New Approach, The Standard, Oct. 1, 1999.

Ante, "Everything You Ever Wanted to Know About Cryptography Legislation . . . (But Were too Sensible to Ask)", PC World Online, Dec. 14, 1999.
Barron, "The Road to Performance: Three Vignettes," Technical Skills and Training, pp. 12-14 (Jan. 1997).
Bauer, "Technology Tools: Just-in-Time Desktop Training is Quick, Easy, and Affordable," Technical Training, pp. 8-11 (May/Jun. 1998).
Beck et al., "Applications of AI in Education," AMC Crossroads vol. 1:1-13 (Fall 1996), Web page, unverified print date of Apr. 12, 2002.
Benson and Cheney, "Best Practices in Training Delivery," Technical Training pp. 14-17 (Oct. 1996).
Bental and Cawsey, "Personalized and Adaptive Systems for Medical Consumer Applications," Communications ACM 45(5):62-63 (May 2002).
Berst, "It's Baa-aack. How Interactive TV is Sneaking Into Your Living Room", The AnchorDesk, May 10, 1999.
Berst, "Why Interactive TV Won't Turn You On (Yet)", The AnchorDesk, Jul. 13, 1999.
Blumenthal et al., "Reducing Development Costs with Intelligent Tutoring System Shells," pp. 1-5, Web page, unverified print date of Apr. 9, 2002, unverified cover date of Jun. 10, 1996.
Borland and Davis, "US West Plans Web Services on TV", CNETNews.com, Nov. 22, 1999.
Brown, "Let PC Technology Be Your TV Guide", PC Magazine, Jun. 7, 1999.
Brown, "Interactive TV: The Sequel", NewMedia, Feb. 10, 1998.
Brusilovsky, "Adaptive Educational Systems on the World-Wide-Web: A Review of Available Technologies," pp. 1-10, Web Page, unverified print date of Apr. 12, 2002.
Brusilovsky, et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.
Brusilovsky, et al., ISIS-Tutor: An Intelligent Learning Environment for CD/ISIS Users, pp. 1-15 Web page, unverified print date of May 2, 2002.
"Building Customer Loyalty Through Business-Driven Recording of Multimedia Interactions in your Contact Center," Witness Systems promotional brochure for eQuality, (2000).
Byrnes et al., "The Development of a Multiple-Choice and True-False Testing Environment on the Web," pp. 1-8, Web page, unverified print date Apr. 12, 2002, unverified cover date of 1995.
Calvi and De Bra, "Improving the Usability of Hypertext Courseware through Adaptive Linking," ACM, unknown page numbers (1997).
Center Products We Saw in 1999, Web page, unverified print date of Mar. 20, 2002, unverified cover date of Feb. 1, 2000.
Cline, "Deja vu—Will Interactive TV Make It This Time Around?", DevHead, Jul. 9, 1999.
Coffey, "Are Performance Objectives Really Necessary?" Technical Skills and Training pp. 25-27 (Oct. 1995).
Cohen, "Knowledge Management's Killer App," pp. 1-11, Web page, unverified print date of Apr. 12, 2002, unverified cover date of 2001.
Cole-Gomolski, "New ways to manage E-Classes," Computerworld 32(48):4344 (Nov. 30, 1998).
Cross, "Sun Microsystems—the SunTAN Story," Internet Time Group 8 (2001).
Crouch, "TV Channels on the Web", PC World, Sep. 15, 1999.
D'Amico, "Interactive TV Gets $99 set-top box," IDG.net, Oct. 6, 1999.
Davis, "Satellite Systems Gear Up for Interactive TV Fight", CNETNews.com, Sep. 30, 1999.
De Bra et al., "Adaptive Hypermedia: From Systems to Framework," ACM (2000).
De Bra, "Adaptive Educational Hypermedia on the Web," Communications ACM 45(5):60-61 (May 2002).
Dennis and Gruner, "Computer Managed Instruction at Arthur Andersen & Company: A Status Report," Educational Technical, pp. 7-16 (Mar. 1992).
Diederich, "Web TV Data Gathering Raises Privacy Concerns", ComputerWorld, Oct. 13, 1998.
Diessel et al., "Individualized Course Generation: A Marriage Between CAL and ICAL," Computers Educational 22(1/2)57-64 (1994).

(56) References Cited

OTHER PUBLICATIONS

Dyreson, "An Experiment in Class Management Using the World-Wide Web," pp. 1-12, Web page, unverified print date of Apr. 12, 2002.
EchoStar, "MediaX Mix Interactive Multimedia With Interactive Television", PRNews Wire, Jan. 11, 1999.
E Learning Community, "Excellence in Practice Award: Electronic Learning Technologies," Personal Learning Network pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
e-Learning the future of learning, THINQ Limited, London, Version 1.0 (2000).
Eline, "A Trainers Guide to Skill Building," Technical Training pp. 34-41 (Sep./Oct. 1998).
Eline, "Case Study: Bridging the Gap in Canada's IT Skills," Technical Skills and Training pp. 23-25 (Jul. 1997).
Eline, "Case Study: IBT's Place in the Sun," Technical Training pp. 12-17 (Aug./Sep. 1997).
Fritz, "CB templates for productivity: Authoring system templates for trainers," Emedia Professional 10(8):6876 (Aug. 1997).
Fritz, "ToolBook II: Asymetrix's updated authoring software tackles the Web," Emedia Professional 10(2):102106 (Feb. 1997).
Furger, "The Internet Meets the Couch Potato", PCWorld, Oct. 1996.
Gibson et al., "A Comparative Analysis of Web-Based Testing and Evaluation Systems," pp. 1-8, Web page, unverified print date of Apr. 11, 2002.
Hallberg and DeFlore, "Curving Toward Performance: Following a Hierarchy of Steps Toward a Performance Orientation," Technical Skills and Training pp. 9-11 (Jan. 1997).
Harsha, "Online Training "Sprints" Ahead," Technical Training pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," Technical Skills and Training pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
"Hong Kong Comes First with Interactive TV", SCI-TECH, Dec. 4, 1997.
Kane, AOL-Tivo: You've Got Interactive TV, ZDNN, Aug. 17, 1999.
Kay, "E-Mail in Your Kitchen", PC World Online, Mar. 28, 1996.
"Keeping an Eye on Your Agents," Call Center Magazine, pp. 32-34, Feb. 1993 LPRs & 798.
Kenny, "TV Meets Internet", PC World Online, Mar. 28, 1996.
Koonce, "Where Technology and Training Meet," Technical Training pp. 10-15 (Nov./Dec. 1998).
Kursh, "Going the distance with Web-based training," Training and Development 52(3):5053 (Mar. 1998).
Larson, "Enhancing Performance Through Customized Online Learning Support," Technical Skills and Training pp. 25-27 (May/Jun. 1997).
Linderholm, "Avatar Debuts Home Theater PC", PC World Online, Dec. 1, 1999.
Linton et al., "OWL: A Recommender System for Organization-Wide Learning," Educational Technical Society 3(1):62-76 (2000).
Lucadamo and Cheney, "Best Practices in Technical Training," Technical Training pp. 21-26 (Oct. 1997).
McNamara, "Monitoring Solutions: Quality Must Be Seen and Heard," Inbound/Outbound pp. 66-67 (Dec. 1989).
Merrill, "The New Component Design Theory: Instruction design for courseware authoring," Instructional Science 16:19-34 (1987).
Metheus X Window Record and Playback, XRP Features and Benefits, 2 pages, Sep. 1994 LPRs.
Minton-Eversole, "IBT Training Truths Behind the Hype," Technical Skills and Training pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" American Association for Artificial Intelligence, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc., USA.
Needle, "Will the Net Kill Network TV?", PC World Online, Mar. 10, 1999.
Nelson et al., "The Assessment of End-User Training Needs," Communications ACM 38(7):27-39 (Jul. 1995).
"NICE and Cisco ICM/IPCC integration", (Feb. 2003), http://www.cisco.com/en/US/solutions/collateral/ns340/ns394/ns165/ns45/ns14/net_brochure09186a00800a3292.pdf.
"NICE Systems announces the next generation of active VoIP recording solutions", Press Release, NICE Systems, Mar. 14, 2006, http://www.nice.com/news/show_pr.php?id=581.
"NICE Systems announces interoperability of its VoIP recording technology with Cisco Systems' customer contact software platform", Business Wire, Jul. 3, 2001. http://findarticles.com/p/articles/mi_m0EIN/is_2001_July_3/ai_76154034.
Notification of Transmittal of the International Search Report and the Written Opinion of the International Searching Authority, dated Jun. 6, 2008.
O'Herron, "CenterForce Technologies' CenterForce Analyzer," Web page, unverified print date of Mar. 20, 2002, unverified cover date of Jun. 1, 1999.
O'Roark, "Basic Skills Get a Boost," Technical Training pp. 10-13 (Jul./Aug. 1998).
Pamphlet, "On Evaluating Educational Innovations," authored by Alan Lesgold, unverified cover date of Mar. 5, 1998.
Papa et al., "A Differential Diagnostic Skills Assessment and Tutorial Tool," Computer Education 18(1-3):45-50 (1992).
Untitled, 10th Mediterranean Electrotechnical Conference vol. 1 pp. 124-126 (2000).
Watson and Belland, "Use of Learner Data in Selecting Instructional Content for Continuing Education," Journal of Instructional Development 8(4):29-33 (1985).
Weinschenk, "Performance Specifications as Change Agents," Technical Training pp. 12-15 (Oct. 1997).
Wilson, "U.S. West Revisits Interactive TV", Interactive Week, Nov. 28, 1999.

\* cited by examiner is a different time my name is Kelly how can I help you know how low I can't even in this cell I'm calling from like if you can see how are you know I'm doing great how are you now can I help you today thanks for asking in the right now all customers that in his this connecting the servers okay okay you or customer okay what is the icon phone number please type by 87 34 Cal 248-3284 okay 82003 the name assume supermarkets okay and this is actually a business account alright what I would need to do is connect over toward business Econ let me give you the drop number in case you need to records Jack number hundred 660 3000 and air al dot.com I do want to thank you for doing business with the a t and t you have a good day I think you know

*Fig. 5A*

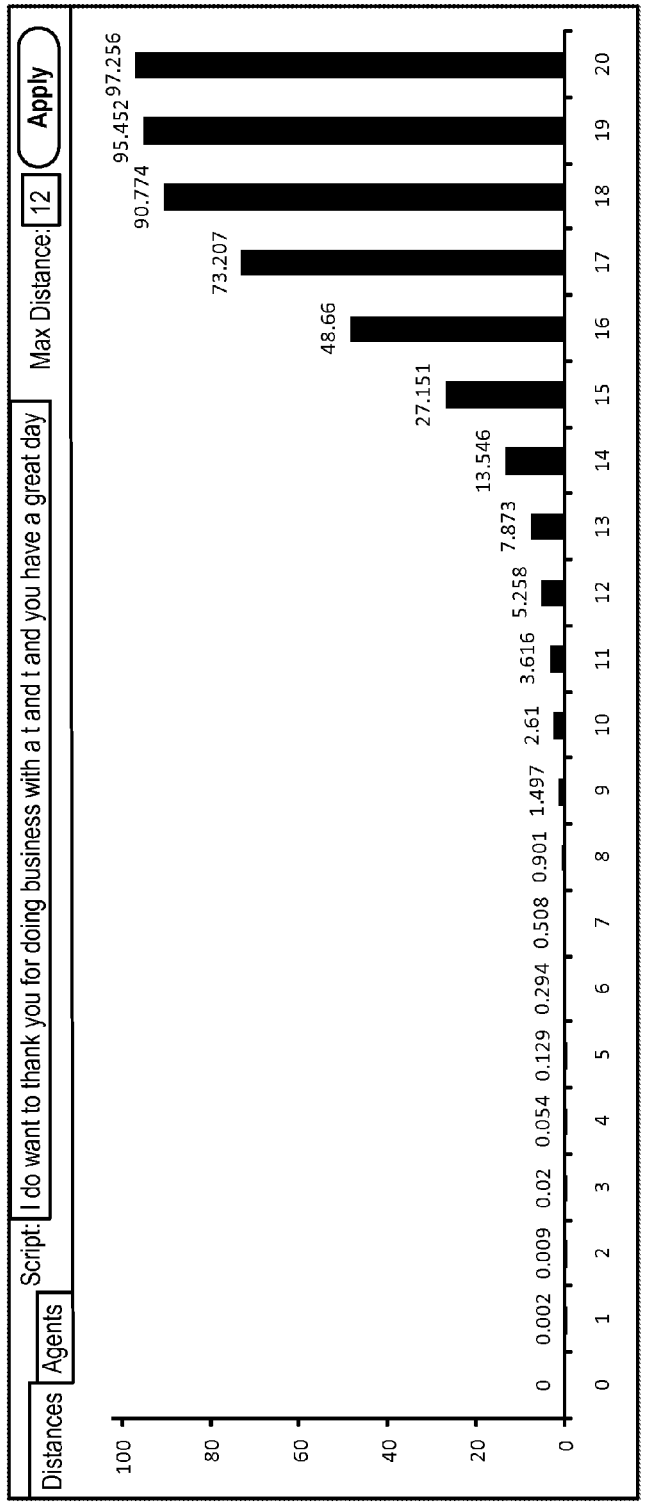

*Fig. 5B*

SPEECH ANALYTICS SYSTEM AND SYSTEM AND METHOD FOR DETERMINING STRUCTURED SPEECH

CROSS-REFERENCE TO RELATED APPLICATIONS

This application is a division of U.S. patent application Ser. No. 12/755,549, filed Apr. 7, 2010, entitled "SPEECH ANALYTICS SYSTEM AND SYSTEM AND METHOD FOR DETERMINING STRUCTURED SPEECH," which claims priority to U.S. Provisional Patent Application Ser. No. 61/167,495, and entitled "STRUCTURED SPEECH", filed on Apr. 7, 2009, and Application Ser. No. 61/178,795, and entitled "SPEECH ANALYTICS SYSTEM", filed on May 15, 2009, the contents of the above are hereby incorporated by reference in their entireties.

BACKGROUND

Conversations within contact centers are typically more structured than everyday speech. The contact center conversations may contain a mixture of free conversation and structured speech. Structured speech is sequences that have a higher repetition rate than free speech. Structured speech may include scripts that are read word-for-word by agents, computer generated voice mail messages, interactive voice response (IVR) generated speech, and figures of speech.

Accuracy is also a concern when translating speech to text to generate transcripts of conversations in the contact center. When performing speech to text there are often errors in the conversion. This may be cause by noise on the line, speakers do not speak clearly, or transcription system itself has errors. In long texts, the probability of errors increases. Thus, it is difficult to determine agent compliance to scripts and to verify quality assurance.

SUMMARY

In accordance with some implementations described herein, there is provided a method for determining structured speech. The method may include receiving a transcript of an audio recording created by a text-to-speech communication processing system. Thereafter, analyzing text in the transcript to determine repetitions within the text, where the repetitions being indicative of structured speech. From the repetitions, a duration distribution of the repetitions may be determined to ascertain a first type of structured speech. The first type of structured speech many be interactive voice response (IVR) generated speech. A length of the repetitions may be determined to ascertain a second type of structured speech. The second type of structured speech may be scripts spoken by, e.g., agents in the contact center.

In accordance with some implementations, there is provided a method for converting speech to text in a speech analytics system. The method may include receiving audio data containing speech made up of sounds from an audio source, processing the sounds with a phonetic module resulting in symbols corresponding to the sounds, and processing the symbols with a language module and occurrence table resulting in text. The method also may include determining a probability of correct translation for each word in the text, comparing the probability of correct translation for each word in the text to the occurrence table, and adjusting the occurrence table based on the probability of correct translation for each word in the text.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative implementations, is better understood when read in conjunction with the appended drawings. For the purpose of illustrating the implementations, there are shown in the drawings example constructions; however, the implementations are not limited to the specific methods and instrumentalities disclosed. In the drawings:

FIG. 5A illustrates an example script marked within a contact

FIG. 5B illustrates a relationship of a number of mistakes to a percentage with respect to identifying a sentence as being a script of FIG. 5A.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Structured speech has a different statistical behavior than free conversation. By understanding the statistical distinction, structured speech may be automatically identified based in Large-Vocabulary Continuous Speech Recognition (LVCSR) outputs from contact centers, given a set of transcribed calls. For example, a different retrieval criterion may be used for structured speech than free conversation. By exploiting the fact that structured speech includes long sentences, a high level of precision and recall may be obtained, in view of the following.

Figure 1:
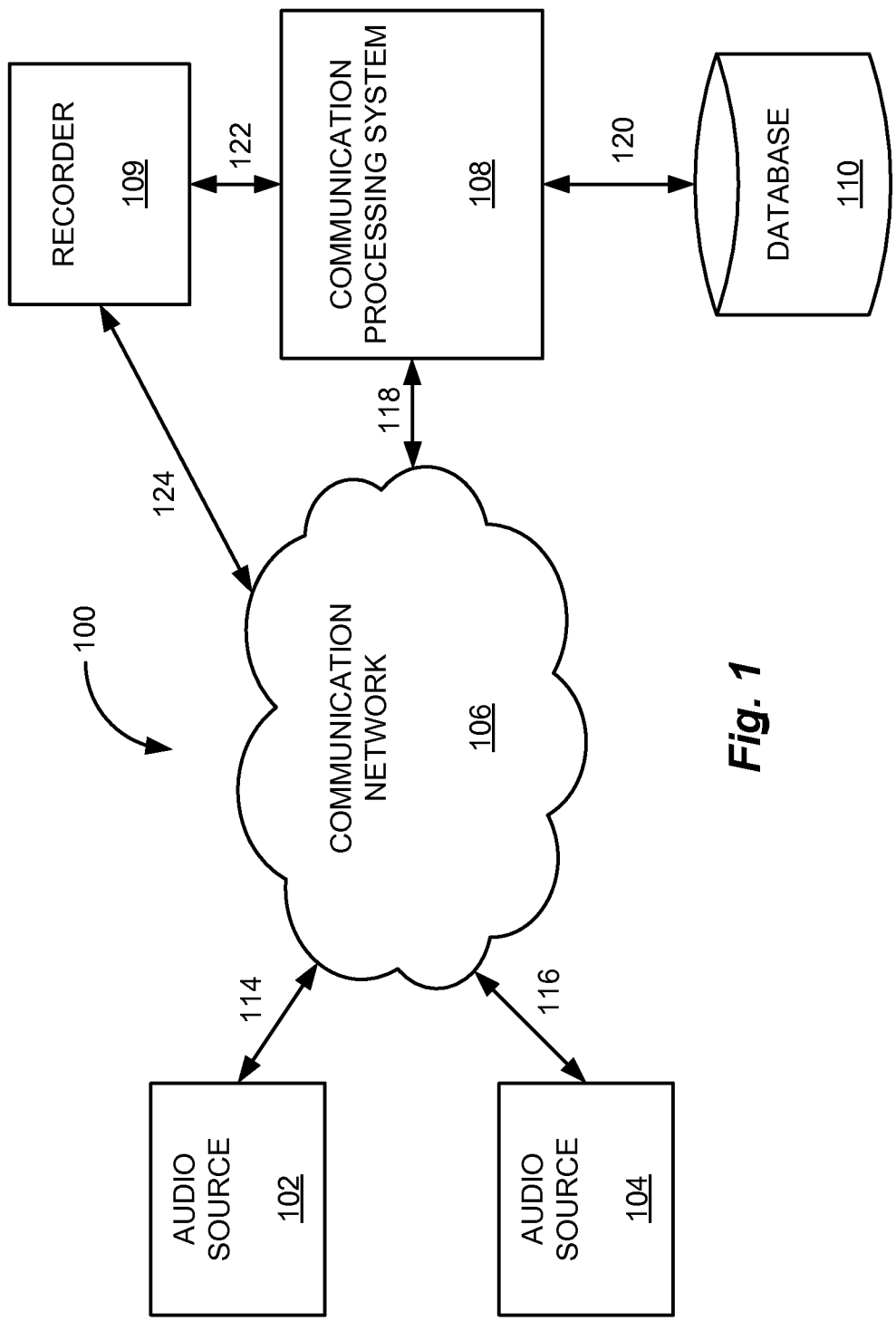
FIG. 1 illustrates a speech to text translation system.

FIG. 1 is a block diagram illustrating a speech analytics system 100. Speech analytics system 100 includes audio source 102, audio source 104, communication network 106, communication processing system 108, recorder 109 and database 110. Audio source 102 exchanges data with communication network 106 through link 114, while audio source 104 exchanges data with communication network 106 through link 116. Communication processing system 108 exchanges data with communication network 106 through link 118, with database 110 through link 120, and with recorder 109 through link 122. Recorder 109 may also communicate with the network 106 over link 124.

Links 110, 114, 116, 118, 120, 122 and 124 may use any of a variety of communication media, such as air, metal, optical fiber, or any other signal propagation path, including combinations thereof. In addition, links 110, 114, 116, 118, 120, 122 and 124 may use any of a variety of communication protocols, such as internet, telephony, optical networking, wireless communication, wireless fidelity, or any other communication protocols and formats, including combinations thereof. Further, links 110, 114, 116, 118, 120, 122 and 124 could be direct links or they might include various intermediate components, systems, and networks.

Communication network 106 may be any type of network such as a local area network (LAN), wide area network (WAN), the internet, a wireless communication network, or the like. Any network capable of transferring data from one device to another device may operate as communication network 106.

The speech analytics system 100 may include recorder 109 that stores the speech from audio source 102 or audio source 104 for later retrieval by communication processing system 108 or other downstream devices or systems. The audio sources 102 and 104 may be any source, such as a telephone, VoIP endpoint, mobile device, general purpose computing device, etc. The recorded speech is made up of a plurality of sounds that are then translated to text.

Communication processing system 108 may be any device capable of receiving data through communication network 106 from other devices, such as audio sources 102 and 104, processing the data, and transmitting data through network 106 to other devices. For example, communication processing system 108 may include a processing system for processing data, a communication interface for receiving and transmitting data, a storage system for storing data, and a user interface. One example embodiment of communication processing system 108 is represented by the communication processing system 108 illustrated in FIG. 6 and described in detail below.

Communications processing system 108 receives speech made up of sounds from audio source 102, audio source 104 or recorder 109, and proceeds to convert the speech to text. First, communication processing system 108 uses a phonetic module to convert the sounds into symbols corresponding to the sounds. Next, communication processing system 108 uses a language module and occurrence table to convert the symbols into text. In addition, communication processing system 108 determines a probable accuracy for each word translated. This probability may be based upon the words proceeding or following the selected word. Finally, communication processing system 108 compares the probable accuracies for each word translated with an occurrence table and adjusts the occurrence table as indicated by the probable accuracies for each word.

In an example, the occurrence table may be based upon the occurrence of words in a test sample. There may be a variety of test samples and occurrence tables corresponding to different dialects, languages, or regional slang. There may also be a variety of test samples and occurrence tables corresponding to different domains such as banking, law, commerce, phone centers, technical support lines, or the like. When speech of a known dialect or domain is received, it is compared to a corresponding occurrence table, and the appropriate occurrence table is updated based upon the probable accuracy of the translation of the speech. Thus, the occurrence table for different dialects and domains are continually being updated as more speech is translated.

While FIG. 1 illustrates communication processing system 108 as a single device, other embodiments may perform the functions of communication processing system 108 in a plurality of devices distributed throughout communication network 108. For example, separate devices may be provided for each different method of speech to text translation, and their resulting transcriptions may then be transmitted to communication processing system 108 for compilation into database 110 and for generation of a database index. Still other examples may provide for translation of the audio data to text within communication processing system 108, while the function of creating the database index may actually be performed within database 110. FIG. 1 is simply representative of one possible structure for performing the methods described here for indexing a database.

In an example embodiment, communication processing system 108 receives audio data from audio sources 102 and 104 through communication network 106. This audio data may utilize any of a wide variety of formats. The audio data may be recorded as .mp3 or .wav files or the like. Further, the audio data may include one or more conversations within a single data file or group of data files. In some embodiments, the audio data may be translated from speech to text by other elements (not shown) within communication network 106, and the translated text may then be provided to communication processing system 108.

Communication processing system 108 processes audio data received from audio sources 102 and 104, producing an index of symbols found within the audio data. These symbols may include phonemes, words, phrases, or the like. The index of symbols may be stored in database 110 in some embodiments. Communication processing system 108 then processes the index of symbols searching for symbols that have a deviation in frequency of occurrence within a time period. This time period may be of any length. For example, communication processing system 108 may receive daily updates of audio data and search for symbols having a deviation in frequency of occurrence in comparison to the audio data received for the previous week. Other embodiments may use other periods of time in a similar method.

Figure 2:
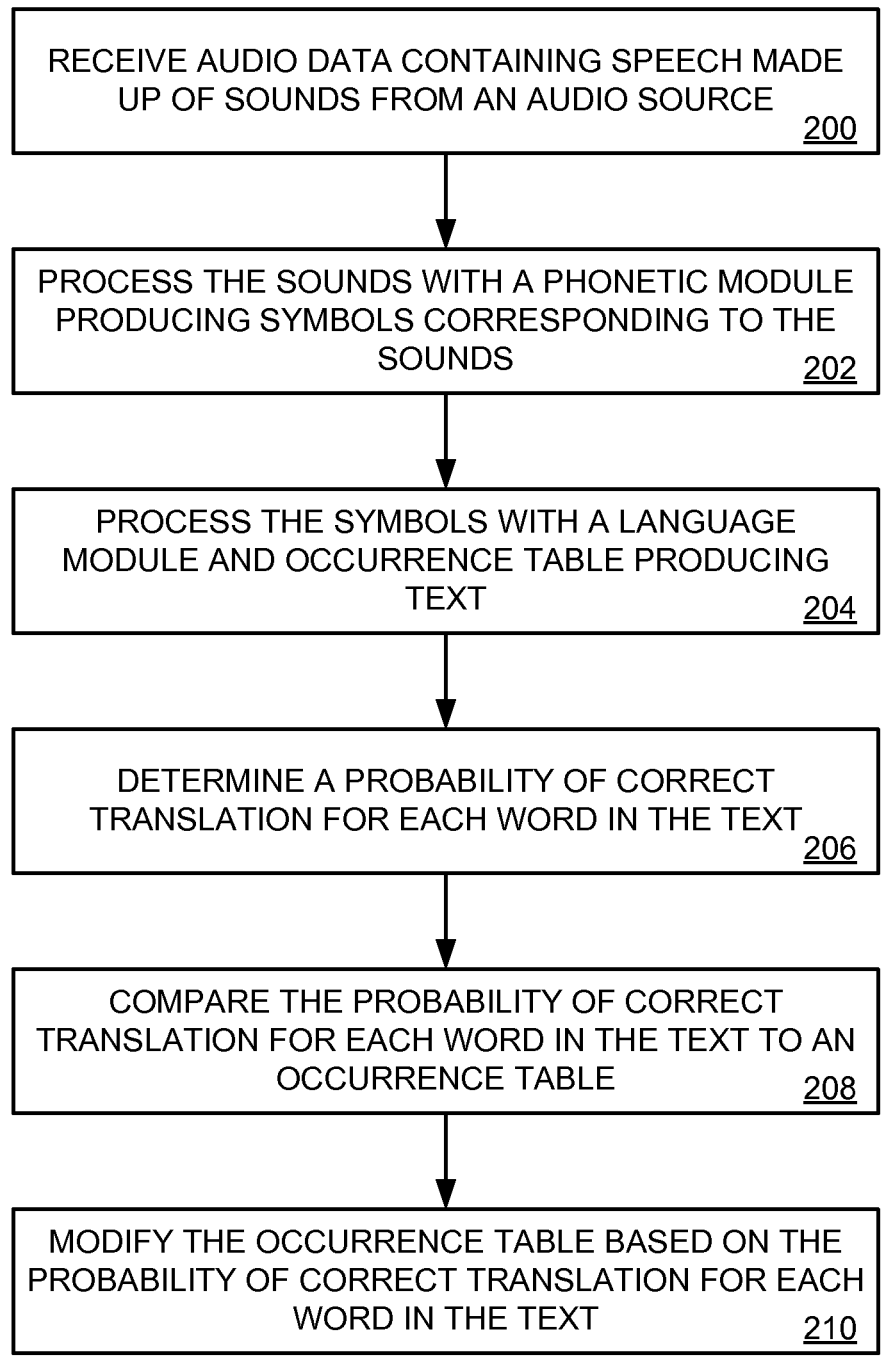
FIG. 2 illustrates a method for translating speech to text in a speech analytics system.

FIG. 2 illustrates a method of performing speech to text translation in a speech analytics system 106. Audio data containing speech made up of sounds is received from either audio source 102 or recorder 104 (operation 200). Speech analytics system 106 processes the sounds using a phonetic module producing symbols corresponding to the sounds (operation 202). Speech analytics system 106 then processes the symbols using a language module and occurrence table producing text (operation 204).

Speech analytics system 106 determines a probability of correct translation for each word in the text (operation 206). This probability may be based in part or in whole on the words proceeding or following the selected word. Speech analytics system 106 compares the probability of correct translation for each word in the text to an appropriate occurrence table (operation 208). This occurrence table may be selected based upon a number of factors such as dialect or language of the speech, and the domain in which the speech was obtained.

Speech analytics system 106 then modifies the occurrence table based on the probability of correct translation for each word in the text (operation 210). This modification may simply change the occurrence probability by a fixed percentage, or by a variable percentage based on the probability of correct translation of the given word, or any other of a wide variety of methods for modification.

FIG. 2 illustrates a method of performing speech to text translation in a speech analytics system 106. Audio data containing speech made up of sounds is received from either audio source 102 or recorder 104 (operation 200). Speech analytics system 106 processes the sounds using a phonetic module producing symbols corresponding to the sounds (operation 202). Speech analytics system 106 then processes the symbols using a language module and occurrence table producing text (operation 204).

Speech analytics system 106 determines a probability of correct translation for each word in the text (operation 206). This probability may be based in part or in whole on the words proceeding or following the selected word. Speech analytics system 106 compares the probability of correct translation for each word in the text to an appropriate occurrence table (operation 208). This occurrence table may be selected based upon a number of factors such as dialect or language of the speech, and the domain in which the speech was obtained.

Speech analytics system 106 then modifies the occurrence table based on the probability of correct translation for each word in the text (operation 210). This modification may simply change the occurrence probability by a fixed percentage, or by a variable percentage based on the probability of correct translation of the given word, or any other of a wide variety of methods for modification.

In accordance with aspects of the disclosure, structured speech may be identified. Structure speech may include IVR, scripts, and figures of speech. With regard to IVR, this type of structured speech is repetitive. Thus, the communication processing system 108 can recognizing errors in a transcription by taking advantage of the repetitive nature of IVR speech. An IVR message may be, "Welcome to ABC Products customer service center. All of our representatives are busy assisting other customers." Similarly, a voicemail system prompt may be, "You have reached the voice mail box of Jane Doe, please leave your message after the tone."

Scripts are another type of structured speech, and are typically statements spoken by agents are, as required by law, certain situations (e.g., disclaimers), and in response to customer inquiries, etc. The scripts are spoken by many different agents with typically only minor modification and timing between the agents. An agent script may be, for example, "For security purposes can you please verify the last four digits of your social security number." Scripts may have medium length sentences, but are repeated among conversations in the contact center.

Figures of speech are small to medium-sized sentences that people tend to say even thought they are not written text read aloud. The figures of speech are typically common phrases, such as "Oh, my!" They occur with some repetition, but are typically shorter than scripts. Similar to a script, figures of speech tend to have some repetition among conversations in the contact center, but are typically shorter in length and of lower frequency.

With regard to free speech, the order and length of words in is variable. Free speech typically does not repeat among conversations. An example of free speech is, "Well, you see, first click on start."

The communication processing system 108 can make determinations of the type of speech by looking words within the transcript. For example, for IVR speech, if a predetermined number or percentage of words in an IVR recording are recognized (e.g., 9 out of 16), the communication processing system 108 can make a determination that a particular segment of the transcript is IVR speech. The communication processing system 108 may make a determination not to index each and every word of the recognized IVR speech.

Figure 3:
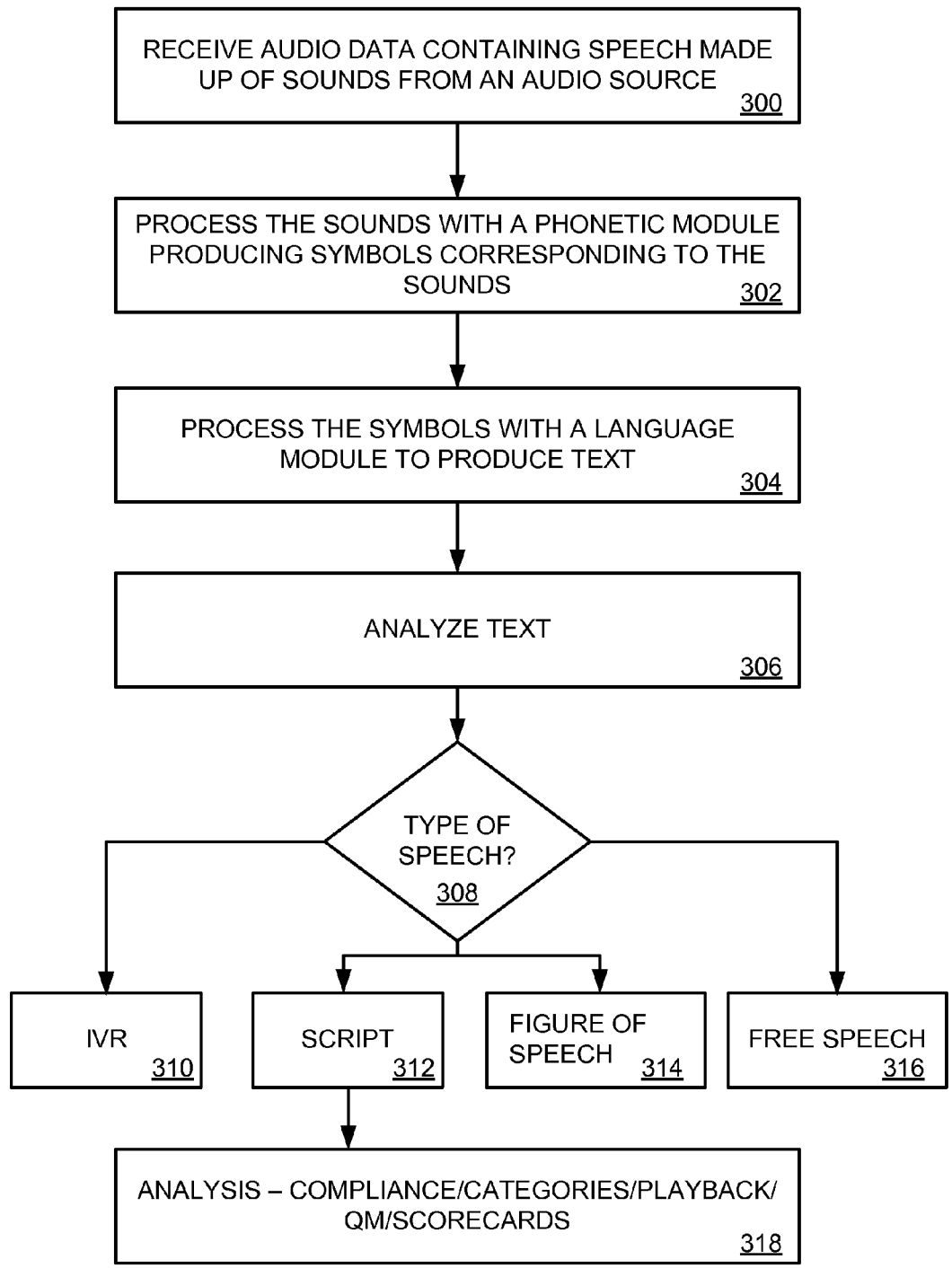
FIG. 3 illustrates a method of determining a type of speech in accordance with a structure.

FIG. 3 illustrates a method of determining a type of speech in accordance with a structure. Audio data containing speech made up of sounds is received from either audio source 102 or recorder 104 (operation 300). Communication processing system 108 processes the sounds using a phonetic module producing symbols corresponding to the sounds (operation 302). Communication processing system 108 then processes the symbols using a language module and occurrence table producing text (operation 304).

Figure 4A:
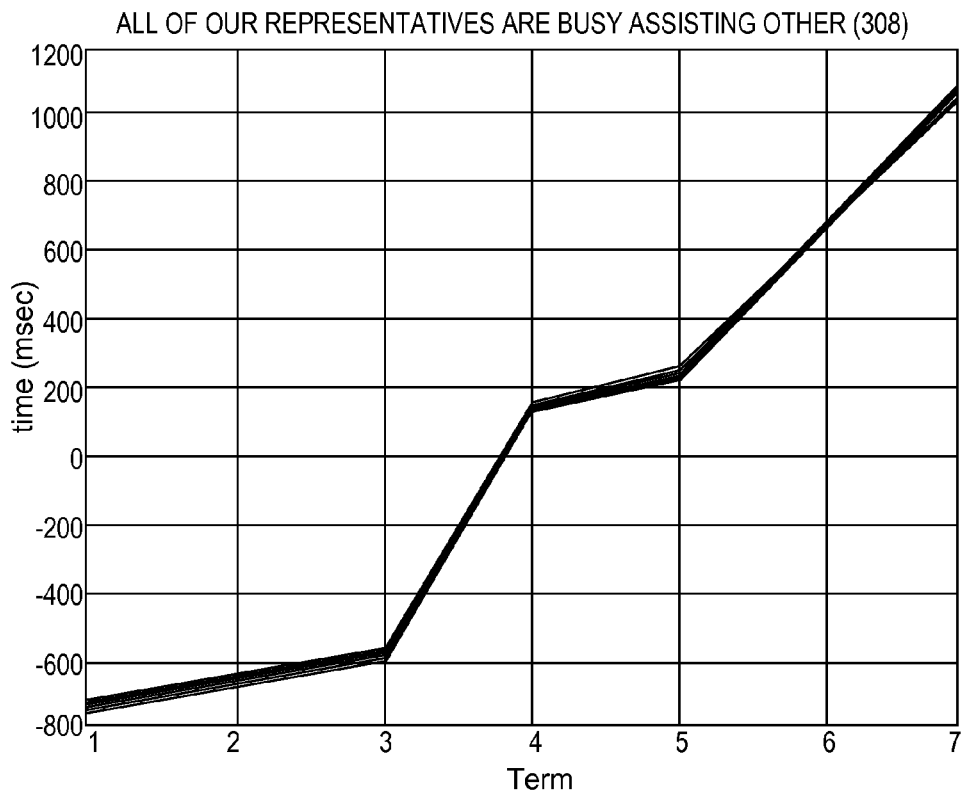
FIGS. 4A and 4B illustrate graphical representations of deviations from a particular sentence.
Figure 4B:
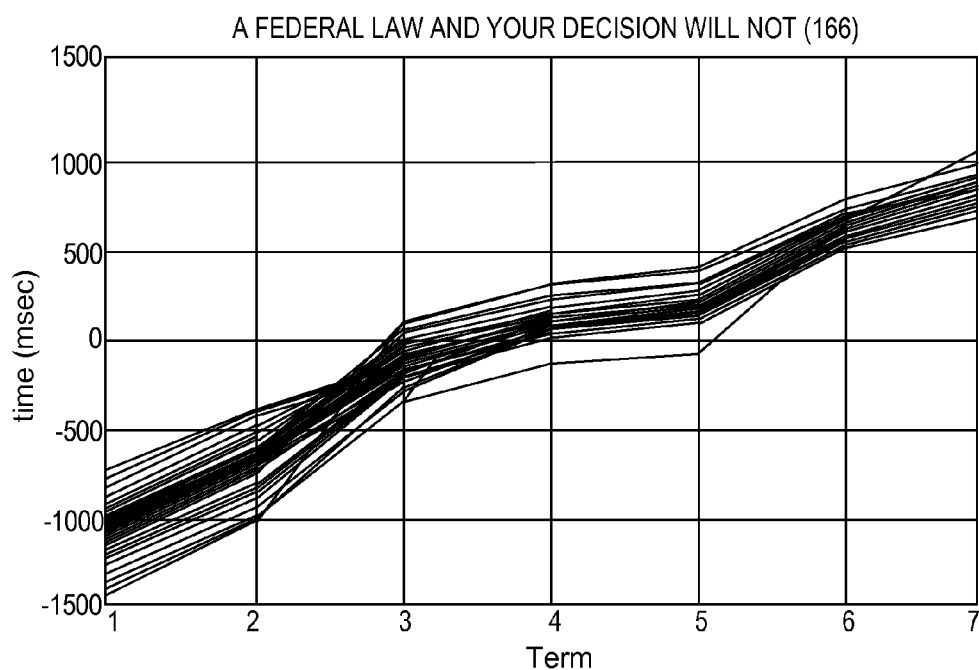

The communication processing system 108 can make analyze the text of the transcribed speech to make determinations of the type of speech (operation 306) by looking words within the transcript. For example, the communication processing system 108 may identify structured speech based upon repetitions. The communication processing system 108 may identify IVR speech based on durations and distributions. For example, FIG. 4A illustrates patterns of IVR speech. When a certain sentence, phrase, statement, etc. repeats over and over, it can be identified. As illustrated, phrases associated with IVR speech show little deviation. However, scripts spoken by agents may exhibit a higher degree of deviation, as shown in FIG. 4B. Thus, the two types of structured speech can be identified and separated.

The communication processing system 108 may make a determination (operation 308) that a particular segment of the transcript is IVR speech based on the duration distribution of the particular segment. As such, the IVR speech can be separated (operation 310). For example, the segment, "All of our representatives are busy assisting other customers" can be identified as IVR speech.

Using this knowledge, the communication processing system 108 may determine if a predetermined number of words in an IVR recording are recognized. In accordance with the determination, the communication processing system 108 may make a determination not to index each and every word of the recognized IVR speech.

After separating IVR phrases, scripts spoken by agents can be identified by, e.g., examining a length of the phrase. As noted above, scripts are read from text or are statements that agents are trained to say, ("A Federal Law and your decision will not affect your service"). Also as noted above, figures of speech are customary statement ("Hello, how can I help you?"). Because figures of speech tend to be a few words, whereas the scripts tend to be longer sentences, a phrase can be categorized as a script (operation 312) or a figure of speech (operation 314). Thus, figures of speech can be separated out from scripts based on length.

Those phrases that do not fall into the above structures are likely to be free speech (operation 316). Separating the structures may be useful, because for example, in scripts, the word "rebate" may have a different meaning than when it occurs in a figure of speech or free speech. Thus, as will be described below, when searching on the word "rebate," a context (script, figure of speech, or free speech) may be included in the index and searched.

Identifying scripts within a contact corpus is useful for analysis purposes (operation 318). In some implementations, agent compliance may be determined. For example, it may be determined which agents do or do not strictly adhere to scripts that include, e.g., disclaimers. Contacts may be reviewed that should include a script, but do not. Agents may be ranked based on their compliance to scripts. In addition, identifying scripts may be used to determine which agents are more or less polite than others. Politeness may be analyzed to determine if agents who are more polite helping with customer retention, sales, etc. Yet further, identifying scripts may determine if agents are attempting to up-sell, and what the characteristics of the calls are in which up-selling is performed.

For contacts within the corpus, scores for a script can be determined by setting a minimum distance between the script and words in the contact. A script may be identified by looking for a word or group of words, a Boolean expression or weighting of words. Pattern matching may be performed if a number of errors are small. However, there is not a need to search each and every word in script for it to be correct. In some implementations, an order of the words may be used.

For example, as show in FIG. 5, a threshold number of mistakes (insertions, replacements, deletions) may be set, e.g., 18 to identify a percentage of sentences as being the script. Using this approach a higher recall and precision may be obtained because the script itself has a more accurate signature that looking for the each word by itself. For example, the sequence and/or timing of the words can be used.

In some implementations, scripts may be used as categories. For example, the communication processing system 108 may identify the scripts and output a list. The communication processing system 108 may evaluate each contact for the scripts it contains (e.g., binary output). A user may use a "Script Definition Tool" (SDT) to assign a script with a name, color, impact, etc. The user may assign the script with a type, such as a greeting, authentication, hold, transfer or closure. Additional types assigned can be legal, company policy, up-sale, politeness etc. Manual edit of scripts may be performed by the user who may edit the scripts list to focus on interesting scripts and perform "fine tuning." Each script can be given a name, color, impact similarly to categories.

In some implementations, the communication processing system 108 may utilize scripts similarly to categories. For example, scripts may be used as a filter in a query. Since the script is binary, a "NOT" operator can be used for checking compliance. Scripts may be displayed, and impact and relevance determined for a specific query. In a player application, scripts may be marked within a contact (see, e.g., FIG. 5A).

In some implementations, scripts may be identified as part of a quality management and scorecards. A supervisor may obtain a list of sentences that each of his/her agents tends to use. The supervisor may ascertain the greetings/closure each agent uses. The supervisor may determine an agents first call resolution capabilities.

Scripts may be exported to database 110. From database 110, the scripts can be integrated with evaluation forms (QM) and Scorecards. Scripts compliance can be used in QM as metrics for evaluations, and for training purposes. Script adherence reports may be generated to determine which agents exceptionally use certain scripts. The reports may also surface scripts that have exceptionally low or high compliance. For each agent, a graph of his/her compliance to various scripts may be generated, as well as an overall scripts compliance graph for all scripts.

In some implementations, analytics may be performed to determine how the usage of an up-sale script contribute to sales (e.g., using meta data); whether agent politeness leads to better customer satisfaction (e.g., using categories); and whether a polite agent helps improve customer retention; whether complying to company policy has a positive effect on sales. Analytics may determine other aspects, such as what characterizes a specific agent group and what their common scripts are. In addition, it may be determined what characterizes good agents; and what are their common scripts (e.g., using QM data).

In the above, the user need not type in whole script when monitoring agents for compliance, QM, etc. Special identifiers can be added to the index and used to searching purposes.

Figure 6:
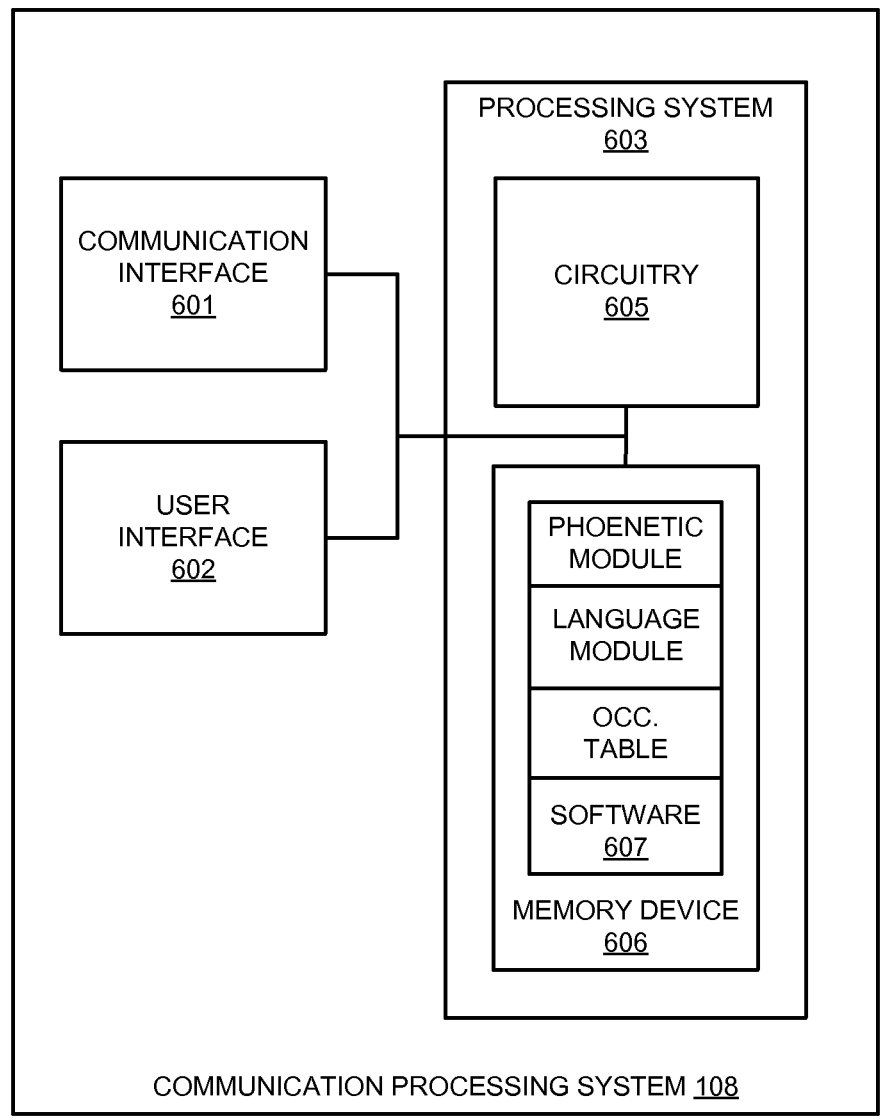
FIG. 6 illustrates the communication processing system of FIG. 1 in greater detail.

FIG. 6 illustrates the communication processing system of FIG. 1 in greater detail. The communication processing system 108 may include communication interface 301, user interface 302, and processing system 303. Processing system 303 is linked to communication interface 301 and user interface 302. Processing system 303 includes processing circuitry 305 and memory device 306 that stores operating software 307.

Communication interface 301 includes components that communicate over communication links, such as network cards, ports, RF transceivers, processing circuitry and software, or some other communication devices. Communication interface 301 may be configured to communicate over metallic, wireless, or optical links Communication interface 301 may be configured to use TDM, IP, Ethernet, optical networking, wireless protocols, communication signaling, or some other communication format—including combinations thereof. In this example, communication interface 301 is configured to receive audio data from recorder 104 or directly from audio source 102.

User interface 302 includes components that interact with a user. User interface 302 may include a keyboard, display screen, mouse, touch pad, or some other user input/output apparatus. User interface 302 may be omitted in some examples.

Processing circuitry 305 includes microprocessor and other circuitry that retrieves and executes operating software 307 from memory device 306. Memory device 306 includes a disk drive, flash drive, data storage circuitry, or some other memory apparatus. Operating software 307 includes computer programs, firmware, or some other form of machine-readable processing instructions. Operating software 307 may include an operating system, utilities, drivers, network interfaces, applications, or some other type of software. When executed by circuitry 305, operating software 307 directs processing system 303 to operate communication processing system 108 as described herein.

In this example, operating software 307 includes a phonetic module that directs processing circuitry 305 to translate speech to sounds, a language module that directs processing circuitry 305 to translate sounds to text, and an occurrence table that is used with the language module to improve the accuracy of the sounds to text translation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for generating a database index for a transcript based on automatic identification by a communication processing system of different types of structured speech in the transcript, the method comprising:

receiving, by a communication processing system, a transcript of an audio recording created by a speech analytics system;

analyzing, by the communication processing system, text in the transcript to determine repetitions within the text that are indicative of structured speech;

calculating, by the communication processing system, a duration distribution of the repetitions within the text to ascertain, by the communication processing system, whether a first segment of the transcript comprises a first type of structured speech, wherein the first type of structured speech includes interactive voice response (IVR) generated speech;

calculating, by the communication processing system, a length of the repetitions within the text to ascertain, by the communication processing system, whether a second segment of the transcript comprises a second or third type of structured speech, wherein the communication processing systems determines that the second segment comprises the third type of structured speech as opposed to the second type of structured speech when the length of the repetitions found in the text is greater than a predetermined threshold, wherein the second type of structured speech includes scripts spoken by agents and the third type of speech includes figures of speech; and generating, by the communication processing system, a database index for the transcript such that the first segment is marked in a transcript database as comprising the first type of structured speech and the second segment is marked in the transcript database as comprising the second or third type of structured speech.

2. The method of claim 1, further comprising applying a distance threshold to determine contacts that contain the second type of structured speech.

3. The method of claim 2, wherein the distance threshold is approximately 18.

4. The method of claim 1, further comprising analyzing the second type of speech to determine one of compliance, quality management, and categories.

5. The method of claim 4, further comprising:
defining the second type of speech as a category; and
evaluating a contact to determine if the contact contains the category.

6. The method of claim 4, further comprising using the second type of speech as a filter in a query.

* * * * *